United States Patent [19]

Tomlinson

[11] Patent Number: 4,821,120
[45] Date of Patent: Apr. 11, 1989

[54] TELEVISION SUB-CARRIER TRANSMISSION

[75] Inventor: Martin Tomlinson, Totnes, England

[73] Assignee: Devon County Council, Devon, England; a part interest

[21] Appl. No.: 873,430

[22] Filed: Jun. 12, 1986

[30] Foreign Application Priority Data

Jun. 13, 1985 [GB] United Kingdom ................. 8515043
Nov. 20, 1985 [GB] United Kingdom ................. 8528541

[51] Int. Cl.⁴ ............................................. H04N 7/08
[52] U.S. Cl. .................................... 358/142; 358/167; 455/223; 375/1
[58] Field of Search ................. 358/142, 141, 23, 166, 358/167, 188, 174, 189, 11; 370/69.1, 121; 455/61, 70, 63, 103, 250, 232, 136, 337, 42, 310, 223, 311, 224, 218, 222; 320/120; 325/1

[56] References Cited

U.S. PATENT DOCUMENTS

| | | | |
|---|---|---|---|
| 3,733,438 | 5/1973 | Haley et al. | 370/121 |
| 4,078,245 | 3/1978 | Johnson et al. | 358/86 |
| 4,283,239 | 8/1981 | Martinez | 358/23 X |
| 4,312,072 | 1/1982 | Vogel | 375/1 |
| 4,327,446 | 4/1982 | Dressler | 455/223 |
| 4,376,952 | 3/1983 | Troiano | 358/167 |
| 4,494,238 | 1/1985 | Groth Jr. | 375/1 |
| 4,510,624 | 4/1985 | Thompson et al. | 455/311 X |
| 4,520,396 | 5/1985 | Dischert et al. | 358/167 |
| 4,556,973 | 12/1985 | Uemura | 358/142 X |
| 4,592,071 | 5/1986 | Prigent | 375/42 |
| 4,606,039 | 8/1986 | Nicholas et al. | 375/1 |
| 4,622,520 | 11/1986 | Kureda | 455/223 X |
| 4,658,296 | 4/1987 | Beech | 358/167 |

FOREIGN PATENT DOCUMENTS 2201426 11/1983 Japan .................... 455/224

Primary Examiner—James J. Groody
Assistant Examiner—Victor R. Kostak
Attorney, Agent, or Firm—Hale and Dorr

[57] ABSTRACT

In a receiver for the reception of satellite television signals sub-carrier signals carrying, for example, data are recovered from the demodulated television signal and themselves demodulated to provide data outputs. Prior to the second demodulation, each sub-carrier signal is averaged to improve its signal-to-noise, ratio, thereby taking advantage of the relatively small basic bandwidth of the sub-carrier signal to enable satisfactory reception of the signal in poor reception conditions when the received signal is too weak to obtain an acceptable television picture signal. Impulse noise in the received signal is reduced prior to averaging. To avoid intermodulation products being generated by the transmission and reception of several sub-carriers together, direct sequence modulation of the transmitted sub-carriers can be used to spread their power over a wider frequency band. A code lock loop circuit is then used in the receiver to recover the original narrow band signals, which are subsequently averaged to obtain the advantage in signal-to-noise ratio.

21 Claims, 8 Drawing Sheets

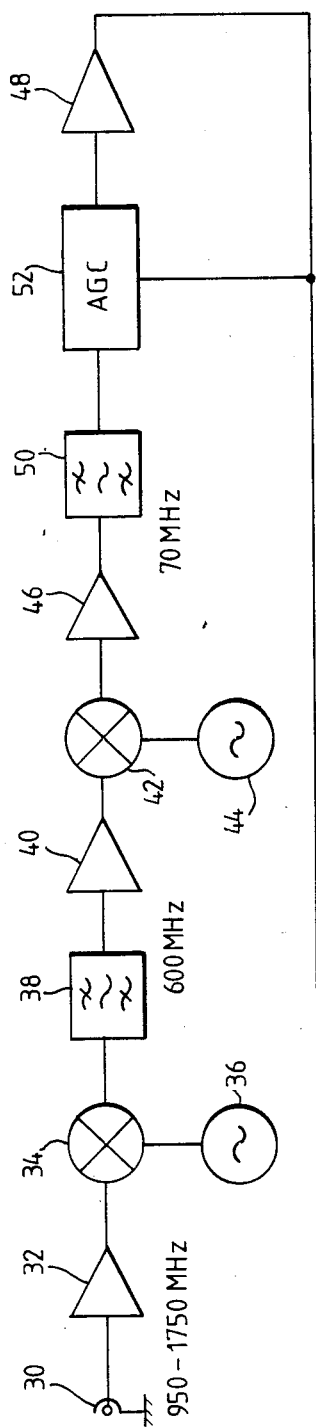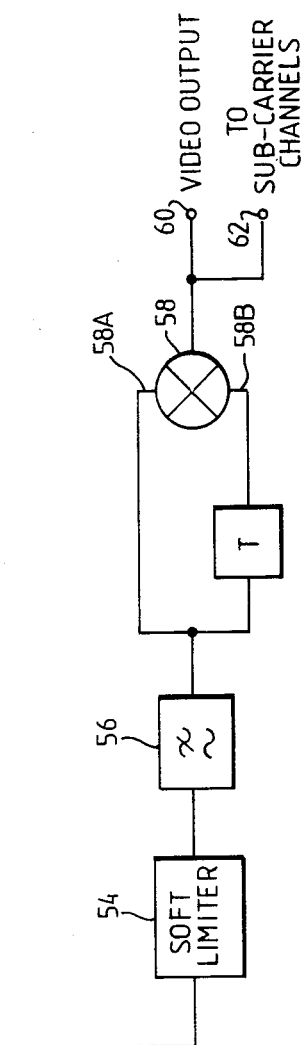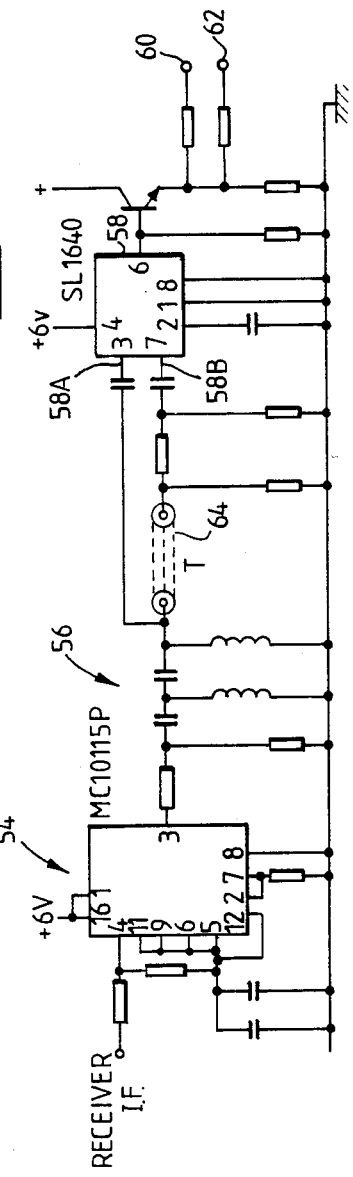
FIG.3.
FIG.4.

TELEVISION SUB-CARRIER TRANSMISSION

BACKGROUND OF THE INVENTION

This invention relates to the transmission of television sub-carrier signals, and in particular to the use of such signals for purposes which are not necessarily associated with the broadcast of television signals transmitted via a carrier signal.

It is accepted practice in satellite television transmission to utilise sub-carriers for the transmission of associated television sound signals, and additional sub-carriers for further sound channels or data channels not associated with the television picture; such additional sub-carrier transmissions are generally referred to as "additional services".

Receivers designed to receive additional services transmitted by sub-carriers can have useful application in, for example, the reception of data or facsimile signals, since such receivers can be installed in low cost ground stations having antenna dishes of small aperture (less than 1 meter diameter). Such signals can be broadcast by means of medium power quasi-direct broadcast satellites or high power direct broadcast satellites.

A limit is set, however, on the minimum antenna dish aperture of the receiving ground station by the need to maintain the received carrier to noise (C/N) ratio of the main television carrier signal above the FM threshold for noise-free reception, typically 10 dB. Consequently the aerial dish aperture of the receiving ground station cannot be reduced to the desirable size of less than 1 meter diameter—for example, the current "EUTELSAT" satellites require a ground station receiving antenna of at least 1.5 meter diameter in order to maintain the C/N ratio of above 10 dB.

A known solution to to this problem is to transmit separate signals or "accesses" to the satellite on discrete frequencies which are unrelated to the television signal frequencies. This technique, known as Single Channel Per Carrier (SCPC) suffers, however, from the disadvantage that the frequency-stability of the frequency sources in the transmitter and the receiver has to be very high in order to resolve the weak narrow band signals. In practice this increases the cost of the ground station, even to the point where it is cheaper to employ a larger receiving antenna and revert to sub-carrier operation.

SUMMARY OF THE INVENTION

An object of the present invention is to provide a communication system which makes use of a television satellite link by means of a sub-carrier or sub-carriers without recourse to a receiver antenna of unacceptably large diameter. This object is achieved according to the invention by providing a receiver for receiving a television signal from an earth-orbiting satellite, wherein the receiver comprises a first demodulator stage for extracting a video signal and at least one information-carrying sub-carrier signal from the received signal, and at least one sub-carrier processing channel coupled to an output of the first demodulator stage and including a signal averaging circuit followed by a second demodulator stage for producing a respective demodulated information signal. The invention takes advantage of the fact that the information content of the or each sub-carrier signal is much smaller than the information content of the television picture signal, so that the sub-carrier signal can be of much smaller bandwidth. A typical sub-carrier signal would have a bandwidth of 100 kHz compared with a bandwidth of 30 MHz for the television picture signal, and the relatively narrow bandwidth allows signal averaging, for example, narrow-band filtering which in turn allows the receiver to be operated below the carrier/noise (C/N) threshold necessary for reception of an acceptably noise-free picture signal. In other words, in contrast to conventional sub-carrier receiving systems in which the deterioration of the strength of the main signal, i.e. the video signal, to a point at which it becomes unrecoverable also leads to the sub-carrier signals being unrecoverable, the present invention allows the sub-carrier signals to be satisfactorily demodulated when the incoming signal strength is several decibels below that required for recovering an acceptable video signal for displaying a television picture.

The receiver may include a plurality of sub-carrier demodulators for sub-carrier additional to the television sound sub-carrier, for example for additional services.

The means for averaging the signal may comprise one or several bandpass filters.

When a receiver is operating below the threshold for noise-free reception at, for example a C/N ratio of 4 dB, the resultant television picture obtained would be unwatchable due to impulse noise. The threshold events which give rise to the impulse noise are present for a duration of approximately 1% of any given transmission time. By using specific measures to suppress impulse noise the remaining 99% of unperturbed demodulated signal may be averaged to improve demodulation of a sub-carrier signal. Impulse noise suppression may be effected by switching means in the input to the signal averaging means, controlled by an impulse noise detector. Alternatively, the first demodulator stage may comprise a threshold extension demodulator which effectively suppresses impulse noise present in the signal fed to the sub-carrier channel or channels, as well as in the picture signal.

There is a risk that when a large number of sub-carriers is employed non-linearity in the demodulator will give rise to intermodulation products. Such interference can be circumvented by the use of a direct sequence spreading code to reduce the sub-carrier power spectral density. Thus where the received signal has a direct sequence sub-carrier modulation to which a spreading code has been applied to widen the bandwidth and reduce the sub-carrier power spectral density the received demodulated signal is converted in the receiver into a narrow band sub-carrier signal by means of a code lock loop. Multiple sub-carriers of different frequency may be employed, using a common direct sequence spreading code. Alternatively, multiple sub-carriers of the same or different frequency may be employed, each using a different respective direct sequence spreading code.

The invention also includes a communications system for transmitting data by means of a television satellite link comprising: (a) a transmitter for transmitting a television signal including a plurality of sub-carriers, (b) an earth-orbiting satellite transponder, and (c) a receiver assembly comprising an antenna coupled to a receiver unit which has a first demodulator stage operable to demodulate the television signal, a video output stage coupled to an output of the first demodulator stage to provide a picture signal for driving a television display, and a plurality of sub-carrier channels also coupled to an output or outputs of the first demodulator stage to provide data output signals from the received sub-carrier signals, each sub-carrier channel comprising a signal averaging circuit followed by a further demodulator stage.

In accordance with another aspect of the present invention, there is provided a method of receiving information transmitted as data by means of a sub-carrier forming part of a satellite television signal, the method including the steps of demodulating the television signal in a receiver demodulation stage to provide a video signal and at least one sub-carrier signal, averaging the sub-carrier signal and demodulating it to produce a data signal containing the said information.

BRIEF DESCRIPTION OF THE DRAWINGS

The invention will now be described, by way of example only, with reference to the accompanying purely schematic drawings, in which:

FIG. 3 is a block diagram of the stages of the receiver of FIG. 1 which are common to the reception of a video signal for producing a television picture and the sub-carier signals;

FIG. 4 is a circuit diagram of the threshold extension demodulator of the receiver of FIGS. 1 and 3;

DETAILED DESCRIPTION OF THE PREFERRED EMBODIMENTS

Figure 1:
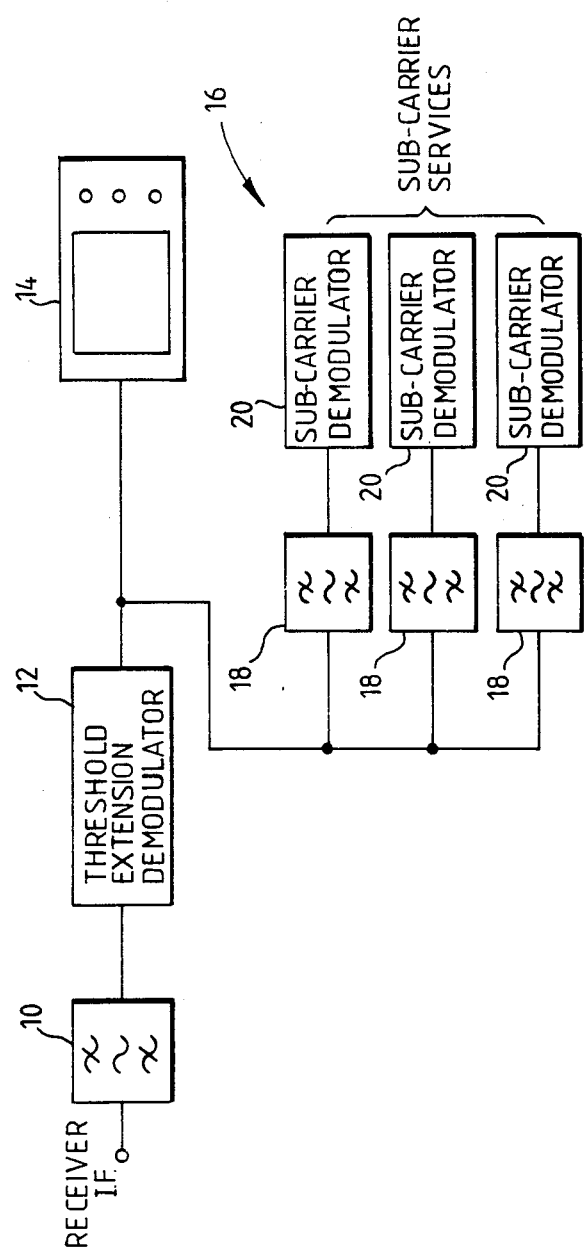
FIG. 1 is a block diagram of part of a first receiver embodiment in accordance with the invention.

FIG. 1 is a block schematic diagram of the demodulator and output stages of a receiver for satellite television signals including a carrier for the television picture signals and three sub-carrier signals for additional services, all of which are frequency-modulated. After filtering in a filter 10 and demodulation in a first FM demodulation stage 12, the output signal is passed as a video signal to a television receiver 14 and also to respective sub-carrier channels 16 for processing the three sub-carrier signals. Each sub-carrier channel 16 includes an averaging filter 18 and, in this case, an FM demodulator 20.

A television satellite such as one of the current EUTELSAT satellites has transponders which each transmit approximately 45 dBW of Equivalent Isotropic Radiated Power (E.I.R.P.). Although the resulting television signal detected in the receiver would have a typical carrrier/noise (C/N) ratio of 8 dB using a 1.2 meter diameter receiving antenna, giving television pictures of marginal quality, the signal to noise ratio of a sub-carrier signal having a bandwidth of 100 kHz centered upon a frequency of 7 MHz would in this case be typically 25 dB. The use of a smaller diameter antenna for the ground receiver station, which is clearly desirable in the interests of economy, would lead to an unacceptably low C/N ratio for producing a television picture. For a receiver antenna of 75 cm diameter the resulting received C/N ratio would typically be as low as 4 dB, which is well below the acceptable threshold. However, using the arrangement shown in FIG. 1, it is possible under these poor signal conditions still to extract useful sub-carrier signals.

A first receiver embodiment in accordance with the invention as illustrated in FIG. 1 includes impulse noise suppression which in this case is carried out by a threshold extension demodulator in which impulse noise below a predetermined level is eliminated from the demodulated output fed to the television receiver 14. This technique is discussed below with reference to FIGS. 3 and 4.

Figure 2:
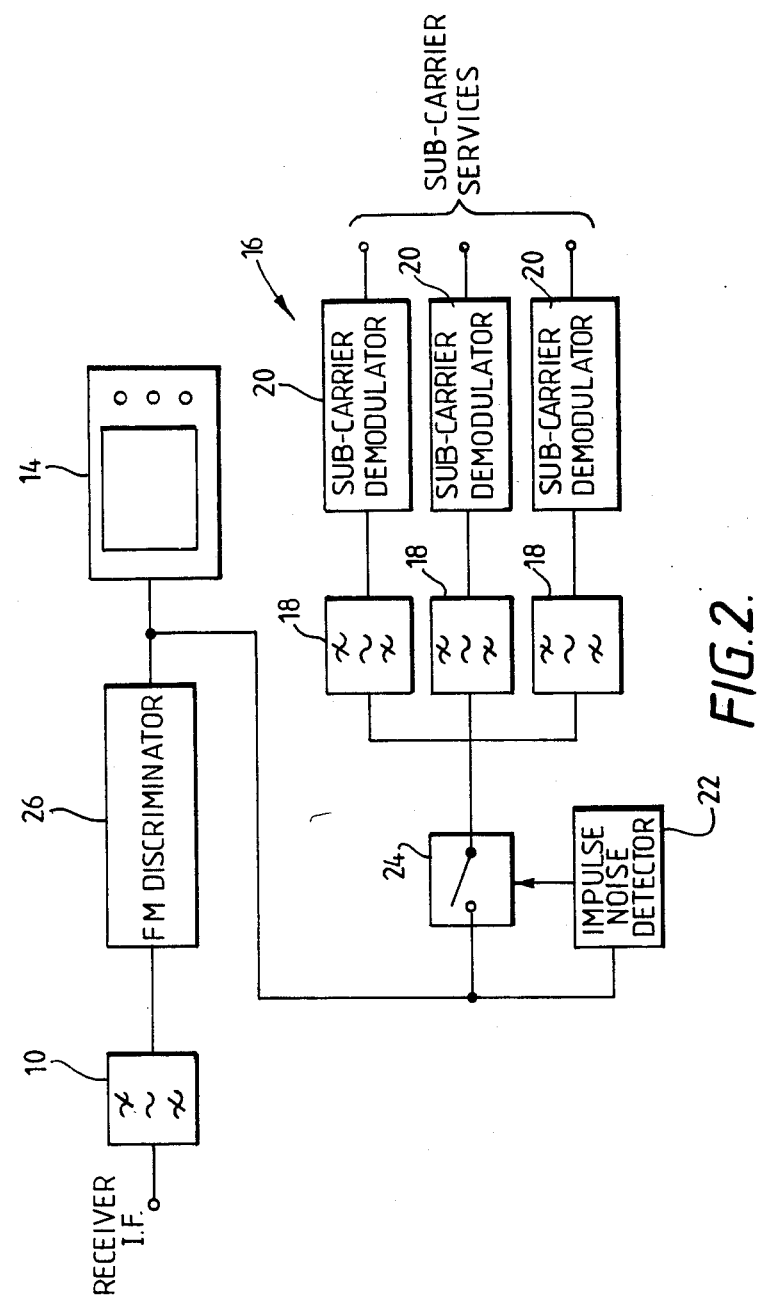
FIG. 2 is a block diagram of part of a second receiver embodiment in accordance with the invention.

An alternative method of impulse noise suppression makes use of a separate impulse noise detector 22 and electronic switching device 24 connected in series between a conventional FM discriminator 26 and the sub-carrier channels 16, as shown in FIG. 2.

With impulse noise suppression the signal-to-noise ratio of a sub-carrier having a 100 kHz bandwidth is 21 dB when using a receiver antenna of 75 cm diameter. This sub-carrier signal-to-noise ratio is still well above the sub-carrier detectable threshold (typically 10 dB) and therefore sub-carrier signal demodulation can be carried out satisfactorily.

The input sub-carrier signals, after impulse noise suppression, are subjected to averaging using bandpass filters 6 for each sub-carrier demodulator 3, each bandpass filter having a passband of, typically, 100 kHz, although wider or narrower filters, e.g. 10 kHz or narrower, can be used according to the basic bandwidth of the sub-carrier signals. In any event, this separate filtering of the sub-carrier signals prior to demodulation drastically improves the signal-to-noise ratio to allow the sub-carrier signals to be successfully demodulated when the signal-to-noise ratio of the video signal is far below the level necessary to produce acceptable picture.

The demodulators 20 shown in FIG. 1 have been referred to as FM demodulators, the sub-carrier signals applied to television signals being commonly FM modulated. However, a better form of modulation for "below threshold" sub-carrier reception is Bi-Phase Shift Keying (B.P.S.K.) or Quadra-Phase Shift Keying (Q.P.S.K.) in conjunction with Forward Error Correction (F.E.C.), which permits operation at a lower sub-carrier C/N ratio, consistent with a demodulated output which is reasonably error-free. Thus, the demodulators 20 may be phase demodulators, especially demodulators designed to output data signals.

The use of a number of sub-carriers for the provision of additional services such as further sound channels data channels and facsimile channels, to small ground stations employing sub-carrier demodulators as illustrated schematically in FIGS. 1 and 2 does not add significantly to the power requirement of the satellite transponder. The percentage of power used by the sub-carriers is small compared to that of the television signal, being typically 0.6%, leading to a degradation of 0.03 dB in the weighted signal-to-noise ratio (S.N.R.) of the television signal. Thus the use of ten such additional sub-carriers would entail a degradation of only 0.3 dB.

Referring to FIG. 3, for completeness the early stages of a satellite TV receiver will now be briefly described. The received signal fed to the input socket 30 of the receiver from a dish antenna (not shown) has already been down-converted once by a mixer mounted on the antenna, so that the signal frequency has been reduced from a down-link frequency of 10.9 to 12.5 Ghz to a typical first intermediate frequency (i.f.) of 950 to 1750 MHz. The received signal is than amplified in a front end amplifier 32, which may be tunable, and mixed down to a second i.f. of 600 MHz by a second mixer 34 and local oscillator 36. After passage through a filter 38 and second i.f. amplifier 40, further down-conversion is performed by a third mixer 42 and associated local oscillator 44 to yield a third i.f. signal of 70 MHz. The third i.f. stage comprises two amplifiers 46 and 48 and a bandpass filter 50 having a bandwidth of around 10 MHz typically. Automatic gain control is employed in the third i.f. stage by means of an AGC stage 52 which attenuates the i.f. signal in strong signal conditions. At this point the signal is a carrier at 70 MHz frequency modulated by a television picture signal and sub-carrier signals. In this embodiment the signal now enters a threshold extension demodulator.

As in conventional FM receivers, the signal is next applied to a limiter 54 to remove amplitude modulation noise and/or interference, but in this case in that it does not have a step function transfer characteristic, but only progressively limits the amplitude of the output signal as the instantaneous amplitude of the input signal increases. The soft limiter provides an output signal which varies in instantaneous level in proportion to the instantaneous level of the input over an appreciable portion of the input signal amplitude range and reaches a limited maximum for part of the time, i.e. when the instantaneous input signal level excursions exceed a certain level. The resultant response characteristic of discriminator output versus input frequency $f_c$, unlike the discontinuous response obtained at all input signal levels with "hard" limited demodulator, has a continuous response with rounded maxima at $f_c = f_0 \pm \frac{1}{4}T$ when the input magnitude $|A(t)|$ is less than $y \cdot \sigma$ where y is a constant normally in the range 1.5 to 3 and $\sigma^2$ is the total noise variance or power.

The received signal may be modeled as $(D+n_i(t)) \cos[2\pi(f_c+V_s \cdot f_n)t+\phi] + n_q(t) \sin(2\pi f_c t+\phi)$ where $n_i(t)$ and $n_q(t)$ are the in-phase and quadrature noise components respectively and:

$$|A(t)| = \sqrt{(D+n_i(t))^2 + n^2 q(t)}$$

At or below the threshold defined by $|A(t)| = y \cdot \sigma$ polarity reversals are often caused by $n_i(t) < -D$, cancelling out the wanted signal instantaneously and causing a near 180° phase shift and consequently an impulse noise spike. The action of the soft limiter ensures that the output magnitude of this noise spike is small, effectively extending the carrier-to-noise threshold to lower a carrier-to-noise ratio for a given disturbance of the demodulated output. The limited amplitude signal then passes through a low-pass filter 56 to an FM demodulator comprising a mixer 58 fed at one input 58A with an undelayed signal and at the other input 58B with the same signal delayed by a delay T, where T is greater than or equal to 0.25/B and less than 1/B, B being the bandwidth of the demodulator, to further reduce impulse noise in the demodulated output signal. The phase delay is arranged to be substantially 90% at the carrier frequency. With this method, impulse noise spikes occur but are averaged out by the choice of unusually long value of the delay T. By extending the delay T beyond that of convention discriminators, phase events due to noise occurring within the demodulator bandwidths and of a character such as to yield an overall output from the mixer 58 of a positive or negative phase value in a conventional discriminator instead give rise generally to an output which has balancing positive and negative phase disturbances. Such an output waveform has no appreciable low frequency spectral energy and does not cause a significant impulse spike. The demodulated output signal is fed to a first output 60 which is coupled to video signal processing stages (not shown) to produce a picture signal for a television display, and to a second output 62 which is coupled to the sub-carrier channels 16 shown in FIG. 1.

The threshold extension demodulator is shown in more detail in the circuit diagram of FIG. 4. The soft limiter 54 comprises two ECL gate line receivers connected in series and embodied in an integrated circuit type MC10115P (Motorola Semiconductors). The output of this circuit is coupled to the low-pass filter 56 comprising pairs of capacitors and inductors as shown. The signal is then split between the two inputs of the mixer 58, the second input being connected via the delay line T, here a 95 cm length 64 of coaxial cable. The mixer is integrated circuit type SL 1640 manufactured by Plessey Semiconductors.

When using a large number of sub-carriers any non-linearity in the demodulator will give rise to intermodulation products. Such interference can be circumvented by using a direct sequence spreading code to reduce the sub-carrier power spectral density. An arrangement for achieving this in the satellite transmitter is shown schematically in FIG. 5, where the television sound sub-carrier is frequency-modulated in an FM modulator 70 and a data sub-carrier is phase-modulated in a Q.P.S.K. modulator 72. The phase-modulated carrier is subjected to direct sequence "spreading" using a direct sequence code generator 74 and mixer 76. A typical "chip rate" would be 2-3 M bits/sec, using a sub-carrier centre frequency of 8 MHz. With such a chip rate the spectral density of sub-carrier signal having a bandwidth of 100 kHz would be reduced by a factor of 13 dB. The code may be any reasonably long binary code (in excess of 1000 bits), for example a maximum length sequence generated by a 10-stage shift register.

Figure 5:
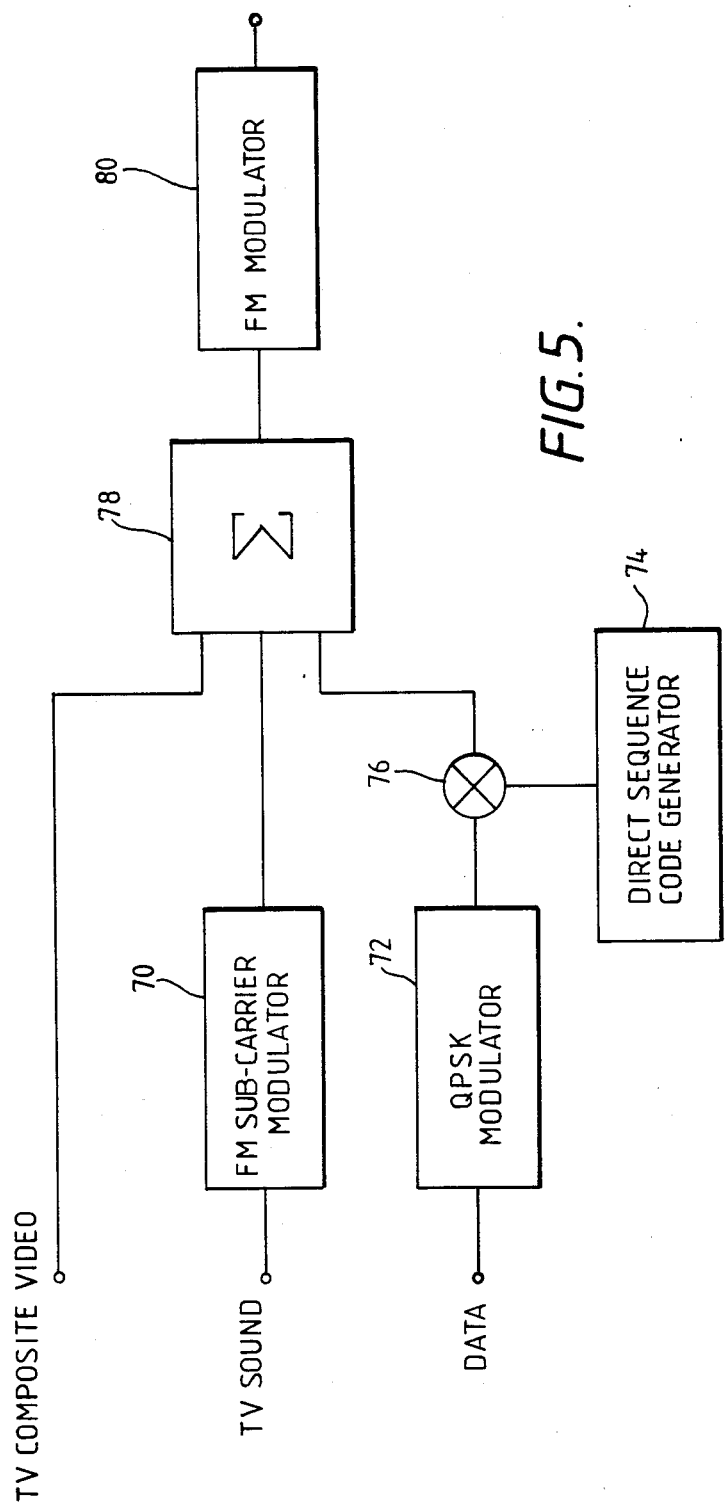
FIG. 5 illustrates schematically an arrangement for direct sequence sub-carrier modulation, for use in conjunction with a third embodiment of the invention.
Figure 6A:
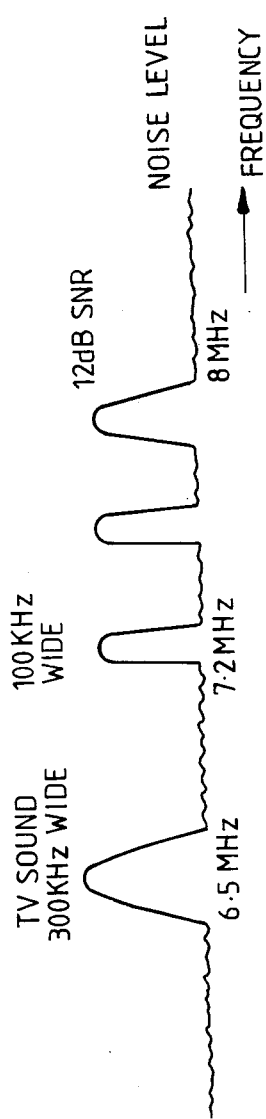
FIGS. 6A and 6B are representations of the power spectrum of a typical sub-carrier signal and a direct sequence spread-spectrum sub-carrier signal respectively.
Figure 6:
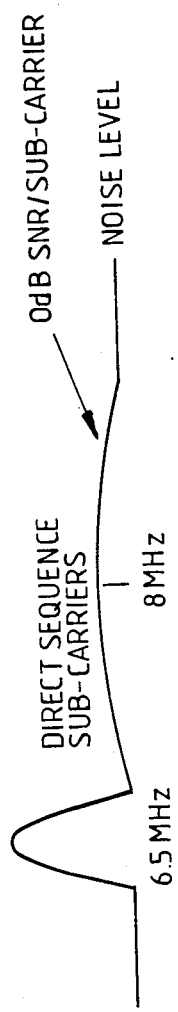

The spread spectrum achieved by the use of the direct sequence spreading code as illustrated in FIG. 5 is illustrated graphically in FIG. 6B, compared with the conventional sub-carrier power spectrum of a typical transmission, shown in FIG. 6A.

The television composite video signal, the television sound sub-carrier signal and the modulated spread-spectrum data subb-carrier signal are combined in an adder 78 before FM modulation in modulator 80 prior to transmission.

It is possible to super impose several direct sequence sub-carriers of the same sub-carrier frequency without any significant degradation in the sub-carrier signal-to-noise ratio (S.N.R.).

Figure 7:
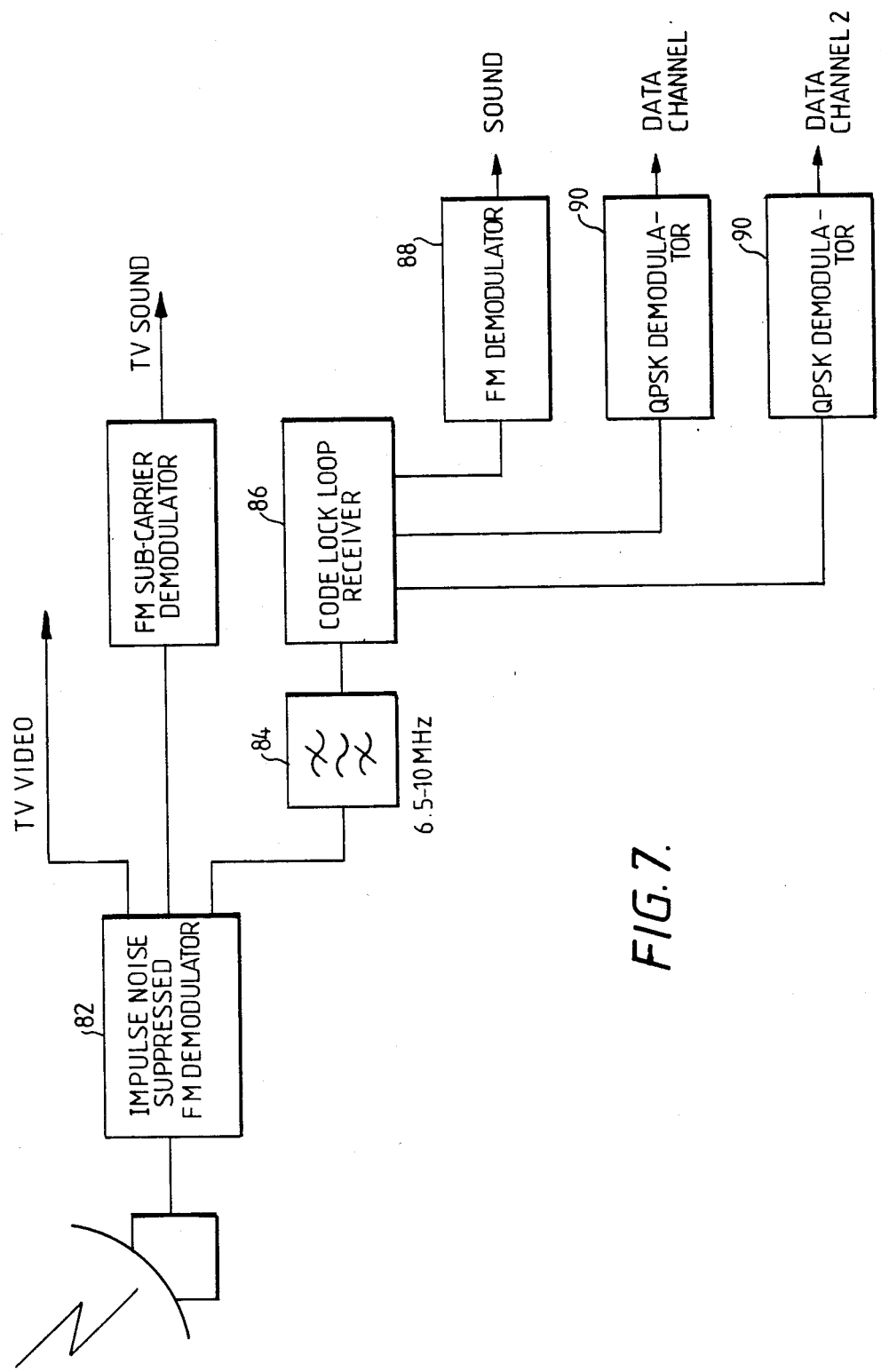
FIG. 7 is a block diagram of a third receiver embodiment in accordance with the invention for demodulating direct sequence sub-carrier signals.

A typical receiver arrangement for the composite signal including the direct sequence sub-carrier modulation is illustrated in block diagram form in FIG. 7. Following the FM demodulator 82, which is provided with impuse noise suppression, the direct sequence sub-carrier is filtered in a bandpass filter 84 having a passband of 6.5–10 MHz. The signal is then converted into a conventional narrowband sub-carrier using a code lock loop receiver 86 locked to the direct sequence code. The resulting sub-carrier signal is demodulated in separate demodulators including an FM demodulator 88 for a separate television sound channel and Q.P.S.K. phase demodulators 90 for the additional service sub-carriers, for example data channels. Averaging of the sub-carrier signals is carried out by bandpass filters (not shown) connected between the code lock loop receiver and each demodulator.

The multiple sub-carriers may have different frequencies and utilise a single direct sequence code, or, in an alternative arrangement, each sub-carrier may have the same frequency but employ its own direct sequence code.

Figure 8:
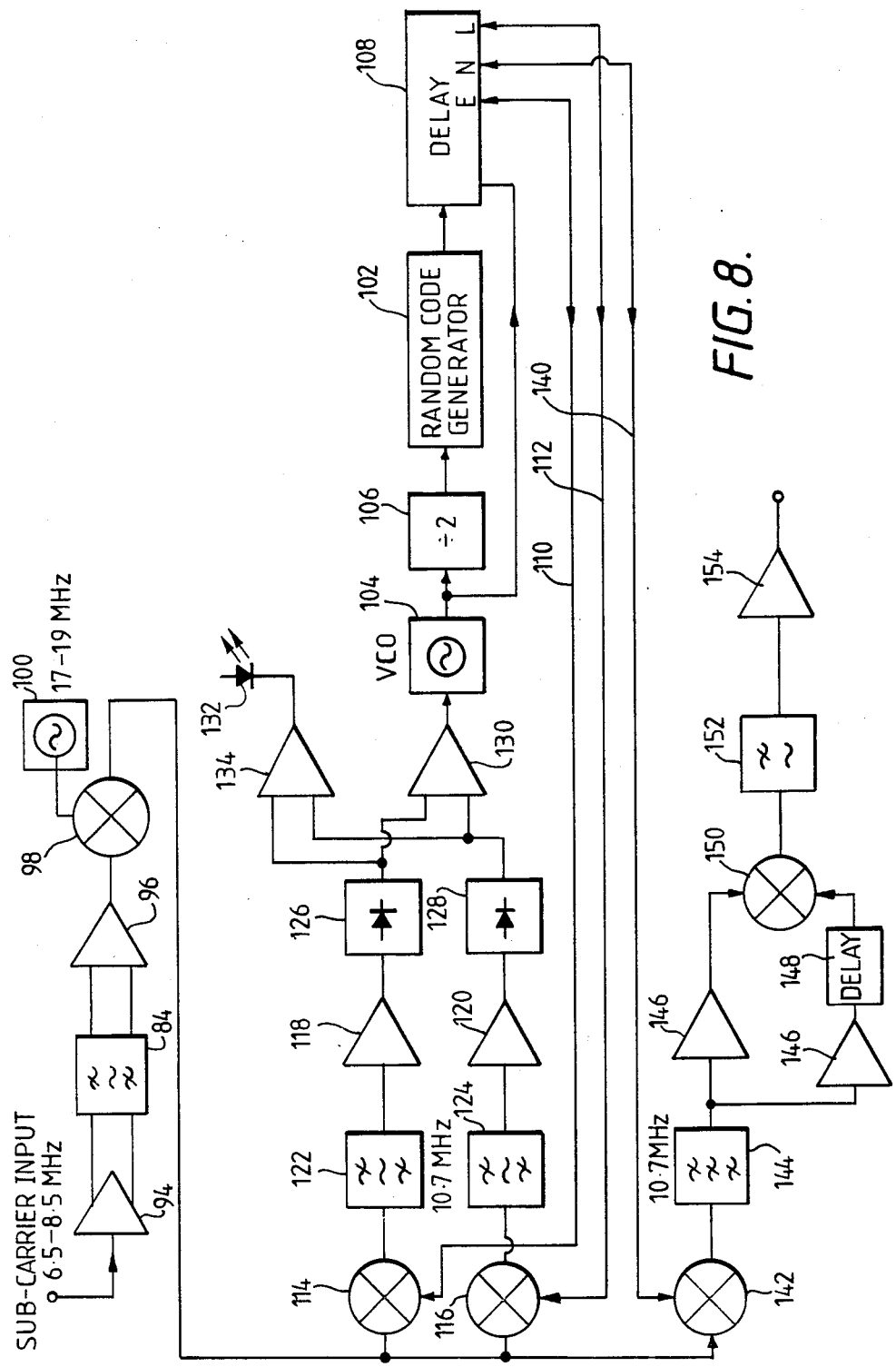
FIG. 8 is a block diagram of part of the third receiver embodiment showing the circuitry for demodulation of one of the sub-carrier signals in more detail.

A "de-spreader" and sub-carrier signal demodulator stage will now be described with reference to FIGS. 8 and 9, which relate to one sub-carrier channel having a single direct sequence code.

The input 92 of the sub-carrier channel would be connected to output 62 of the preceding receiver stages shown in FIGS. 3 and 4. The centre frequency of the received sub-carrier would typically be in the region of 6.5 to 8.5 MHz, and the input filter 84 coupled between first stage amplifiers 94 and 96 has a bandwidth extending typically from 6 MHz to 10 MHz, this being sufficient to accommodate most of the received sub-carrier signal spectra. The amplified sub-carrier signal is down-converted in mixer 98 to a suitable intermediate frequency such as 10.7 MHz by combination with the output of local oscillator 100 which can be tuned to select a required sub-carrier signal. It is now necessary to remove the direct sequence modulation to restore the sub-carrier signal to its original, comparatively narrow, basic bandwidth. In the present example it is assumed that the chip rate of the direct sequence code is 2 M bits/second. The pseudo-random code, which is the same as the code used in the transmitter, is generated in a code generator 102 which is clocked at 2 MHz by a 4 MHz voltage controlled oscillator (VCO) 104 and a divide-by-two circuit 106. Differently delayed versions of this code are produced by a delay circuit 108 and fed via lines 110 and 112 to two code lock loop mixers 114 and 116. Each mixer output drives a respective amplifier 118 or 220 via filters 122 and 124 which can have a bandwidth as narrow as 10 KHz. The amplified and filtered outputs of each mixer 114, 116 are passed through simple diode detectors 126 and 128 to respective inputs of a differential amplifier 130 which control the frequency of oscillation of the 4 MHz VCO 104 to complete the code lock loop. The delayed versions of the pseudo-random code produced by the delay circuit 108 at its output E and L are one bit apart in time and one half a bit earlier and later respectively than the "nominal" code signal produced at a third output labelled N in FIG. 8. The output of the differential amplifier 130 depends on the difference in the phase errors generated by the ½ bit shifts, and adjusts the VCO to equalise the errors, with the result that the loop is locked (as indicated by an LED 132 coupled to a second differential amplifier 134) and the nominal code signal coincides in bit rate and phase to the original modulating direct sequence code used in the transmitter.

Figure 9:
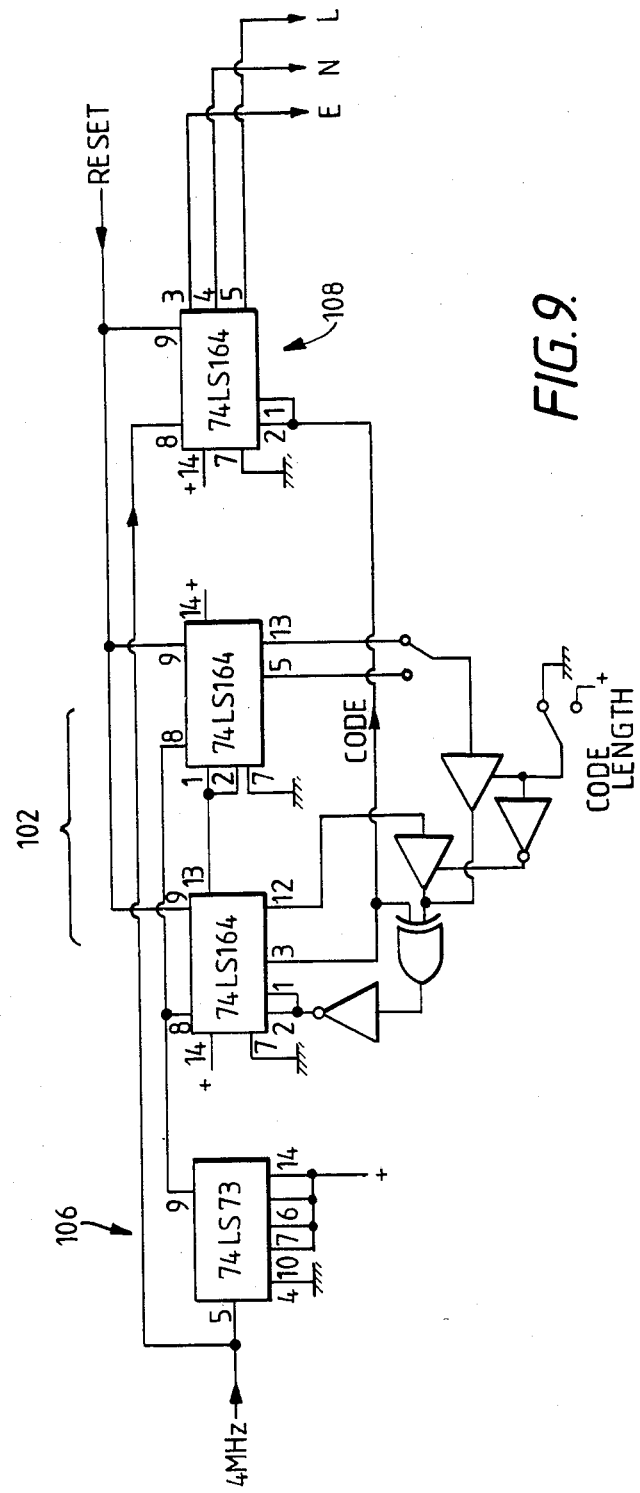
FIG. 9 is a circuit diagram of part of a code lock loop for use in the circuitry of FIG. 8.

The circuit of the code generator and delay stage is shown in FIG. 9.

Having obtained, in the nominal code signal, a code signal synchronised with the originally generated modulating code signal, this is then applied via line 140 to a further mixer 142 which, like mixers 114 and 116, is coupled to the output of the first mixer 98 to receive the selected down-converted spread-spectrum sub-carrier signal at 10.7 MHz. The output of this further mixer 142 is equivalent to the basic narrow-band sub-carrier signal, and can then be averaged in accordance with the invention in a passband filter 144 which has, in the present example, a bandwidth of approximately 100 kHz, to suit a phase-modulated data signal. Demodulation of the sub-carrier signal is carried out by splitting the signal between two branches, both containing a respective amplifier 146, and one containing a delay element 148, and then feeding the signals in the branches to respective inputs of a demodulator mixer 150. The delay element 148 typically introduces a delay approximately equal to the reciprocal of the data rate and an overall phase shift in the range 0° to 90°. A low pass filter 152 coupled to the output of the demodulator mixer 150 removes unwanted demodulation products and the demodulated data signal is then amplified in an output buffer amplifier 154.

I claim:

1. A receiver for receiving a television signal from an earth orbiting satellite, wherein the receiver comprises a first demodulator stage for extracting a video signal and at least one information-carrying sub-carrier signal from the received signal, at least one sub-carrier processing channel coupled to an output of the first demodulator stage and including a signal averaging circuit followed by a second demodulator stage for producing a respective demodulated information signal, and an impulse noise reduction circuit upstream of the signal averaging circuit, whereby said at least one sub-carrier signal can be satisfactorily demodulated when the received signal strength is low such that said video signal is substantially unrecoverable.

2. A receiver according to claim 1, wherein the impulse noise reduction circuit comprises a switching device coupled to a connection which feeds the sub-carrier signal or signals to the or each signal averaging circuit, and an impulse noise detector coupled to the said connection and arranged to operate the switching device to interrupt the sub-carrier signal in the presence of detectable impulse noise.

3. A receiver according to claim 1, wherein the impulse noise reduction circuit comprises a soft limiter in the first demodulator stage.

4. A receiver according to claim 1, wherein the or at least one of the sub-carrier signals is a phase-modulated data signal, and the or each respective second demodulator comprises a phase demodulator with a digital output.

5. A receiver according to claim 1, wherein the or each sub-carrier channel includes an averaging circuit in the form of a bandpass filter having a passband which is substantially narrower than the bandwidth of the television signal.

6. A receiver according to claim 5, wherein the passband of the or each signal averaging circuit is approximately 100 KHz.

7. A receiver according to claim 1, wherein the or each sub-carrier signal is received as a spread spectrum signal, the receiver comprising means coupled between the first demodulator stage and the or each averaging circuit for converting the or each spread spectrum sub-carrier signal to a narrow band signal.

8. A receiver according to claim 7, wherein the received signal includes direct sequence sub-carrier modulation to which a spreading code has been applied to extend the sub-carrier bandwidth and reduce the sub-carrier spectral power density, the said converting means comprising a code lock loop circuit.

9. A receiver according to claim 8 arranged to receive a plurality of sub-carriers of different frequency to which a common direct sequence spreading code has been applied.

10. A receiver according to claim 8 arranged to receive a plurality of sub-carriers of different frequency, each sub-carrier having had a respective direct sequence spreading code applied to it, wherein the converting means comprised a plurality of code lock loop circuits.

11. A receiver for receiving a television signal from an earth orbiting satellite, wherein the receiver comprises a first demodulator stage for extracting a video signal and at least one information-carrying sub-carrier signal from the received signal, at least one sub-carrier processing channel coupled to an output of the first demodulator stage and including a signal averaging circuit followed by a second demodulator stage for producing a respective demodulated information signal, and an impulse noise reduction circuit upstream of the signal averaging circuit, the impulse noise reduction circuit being contained in the first demodulator stage in the form of a mixer arranged to receive an intermediate signal which has been split into two components, each component being fed to a respective input of the mixer, wherein one of the said components is delayed with respect to the other by a time T, defined by $(0.25/B) \leq T < 1/B$, where B is the demodulator bandwidth.

12. A communicaton system for transmitting data by means of a television satellite link comprising:
(a) a transmitter for transmitting a television signal including a plurality of sub-carriers, (b) an earth-orbiting satellite transponder, and (c) a receiver assembly comprising an antenna coupled to a receiver unit which has a first demodulator stage operable to demodulate the television signal, a video output stage coupled to an output of the first demodulator stage to provide a picture signal for driving a television display, and a plurality of sub-carrier channels also coupled to an output or outputs of the first demodulator stage to provide data output signals from the received sub-carrier signals, each sub-carrier channel comprising a signal averaging circuit followed by a further demodulator stage and an impulse noise reduction circuit upstream of the averaging circuits whereby said at least one sub-carrier signal can be satisfactorily demodulated when the received signal strength is low such that said video signal is substantially unrecoverable.

13. A system according to claim 12, wherein the transmitter includes means for applying a direct sequence code to each sub-carrier to reduce its spectral power density, and wherein the receiver includes at least one code lock loop circuit coupled to receive spread spectrum sub-carrier signals from the first demodulator stage and to convert the said sub-carrier signals into signals having a relatively narrow bandwidth.

14. A method of receiving information transmitted as data by means of a sub-carrier forming part of a satellite television signal, the method inlcuding the steps of demodulating the television signal in a receiver demodulation stage to provide a video signal and at least one sub-carrier signal, reducing impulse noise in the subcarrier signal, averaging the sub-carrier signal and demodulating it to produce a data signal containing the said information by a demodulator having a mixer coupled to receive components of a received intermediate frequency signal delayed with respect to each other by a time T, where $(0.25/B \leq T < 1/B)$, B being the bandwidth of the signal to be demodulated.

15. A method of receiving information transmitted as data by means of a sub-carrier forming part of a satellite television signal, the method including the steps of demodulating the television signal in a receiver demodulation stage to provide a video signal and at least one sub-carrier signal, reducing impulse noise in the sub-carrier signal, averaging the sub-carrier signal and demodulating it to produce a data signal containing the said information.

16. A method according to claim 15, wherein the impulse noise is reduced in the receiver demodulator stage by a soft limiter.

17. A method according to claim 15, wherein the impulse noise is reduced by sensing the presence of impulse noise at the output of the receiver demodulator stage and operating switching means to interrupt the passage of the sub-carrier signals.

18. A method according to claim 15, wherein the sub-carriers are received as spread spectrum signals, wherein the demodulated sub-carrier signals are converted to narrow band signals.

19. A receiver for receiving a television signal from an earth orbiting satellite, wherein the receiver comprises,
a first demodulator stage for extracting a video signal and at least one information-carrying sub-carrier signal from the received signal, each sub-carrier being received as a spread spectrum signal,
at least one sub-carrier processing channel coupled to an output of the first demodulator stage and including a signal averaging circuit followed by a second demodulator stage for producing a respective demodulated information signal,
means coupled between the first demodulator stage and the or each averaging circuit for converting the or each spread spectrum sub-carrier signal to a narrow band signal.

20. A communication system for transmitting data by means of a television satellite link comprising:
(a) a transmitter for transmitting a television signal including a plurality of sub-carriers, said transmitter including a means of applying a direct sequence code to each sub-carrier to reduce its spectral power density, (b) an earth orbiting satellite transponder, and (c) a receiver assembly comprising an antenna coupled to a receiver unit which has a first demodulator stage operable to demodulate the television signal, a video output stage coupled to an output of the first demodulator stage to provide a picture signal for driving a television display, a plurality of sub-carrier channels also coupled to an output or outputs of the first demodulator stage to provide data output signals from the received sub-carrier signals, each sub-carrier channel comprising a signal averaging circuit followed by a further demodulator stage, and at least one code lock loop circuit coupled to receive spread spectrum sub-carrier signals from the first demodulator stage and to convert the said sub-carrier signals into signals having a relatively narrow bandwidth.

21. A method of receiving information transmitted as data by means of a sub-carrier forming part of a satellite television signal, the method including the steps of demodulating the television signal in a receiver demodulation stage to provide a video signal and at least one sub-carrier signal, averaging the sub-carrier signal and demodulating it to produce a data signal containing the said information wherein the sub-carriers are received as spread spectrum signals and wherein the demodulated sub-carrier signals are converted to narrow band signals.

* * * * *